US009753647B2

United States Patent
Colvig et al.

(10) Patent No.: US 9,753,647 B2
(45) Date of Patent: Sep. 5, 2017

(54) DEDUPLICATING CHUNK DIGESTS RECEIVED FOR CHUNKS IN OBJECTS PROVIDED BY CLIENTS TO STORE

(71) Applicant: International Business Machines Corporation, Armonk, NY (US)

(72) Inventors: Arthur John Colvig, Beaverton, OR (US); Yu Meng Li, Beijing (CN); Michael G. Sisco, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/849,577

(22) Filed: Sep. 9, 2015

(65) Prior Publication Data
US 2017/0068459 A1 Mar. 9, 2017

(51) Int. Cl.
*G06F 12/00* (2006.01)
*G06F 3/06* (2006.01)
*G06F 12/14* (2006.01)
*G06F 9/52* (2006.01)

(52) U.S. Cl.
CPC ............ *G06F 3/0608* (2013.01); *G06F 3/067* (2013.01); *G06F 3/0622* (2013.01); *G06F 3/0641* (2013.01); *G06F 9/528* (2013.01); *G06F 12/1475* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 8,306,948 B2 | 11/2012 | Chou et al. | |
| 8,639,663 B2 | 1/2014 | Anglin et al. | |
| 8,683,153 B1 | 3/2014 | Long et al. | |
| 8,799,601 B1 | 8/2014 | Chen et al. | |
| 8,805,796 B1 | 8/2014 | Hu et al. | |
| 8,825,972 B1 | 9/2014 | Tsaur | |
| 8,930,306 B1* | 1/2015 | Ngo .................. | G06F 17/30194 707/610 |
| 9,043,287 B2 | 5/2015 | Periyagaram et al. | |
| 2004/0199734 A1* | 10/2004 | Rajamani ................ | G06F 9/524 711/163 |
| 2015/0193170 A1 | 7/2015 | Sundaram et al. | |

OTHER PUBLICATIONS

"Efficient Deduplicated Data Extent Discovery" dated Nov. 30, 2011, an IP.com Prior Art Database Technical Disclosure, IPCOM000212843D, Total 3 pages.

\* cited by examiner

*Primary Examiner* — Daniel Tsui
(74) *Attorney, Agent, or Firm* — David W. Victor; Konrad, Raynes, Davda and Victor LLP (57) ABSTRACT

Provided are a computer program product, system, and method for deduplicating chunk digests received for chunks in objects in objects provided by clients to store in a storage. An index has chunk signatures calculated from chunks of data in the data objects in the storage. A transaction requests a shared lock for a chunk digest calculated from a chunk in an object to add to the storage. In response to not receiving the shared lock, the transaction is granted a shared lock to the chunk digest in wait mode. The transaction does not proceed until being granted the shared lock. In response to receiving the shared lock, a determination is made as to whether the chunk digest is in the index. A reference to the chunk data is provided for the object when the chunk digest is indicated in the index.

22 Claims, 7 Drawing Sheets

FIG. 1

Object Information

FIG. 2

Deduplication Index Entry

FIG. 3

Lock Information

DEDUPLICATING CHUNK DIGESTS RECEIVED FOR CHUNKS IN OBJECTS PROVIDED BY CLIENTS TO STORE

BACKGROUND OF THE INVENTION

1. Field of the Invention

The present invention relates to a computer program product, system, and method for deduplicating chunk digests received for chunks in objects in objects provided by clients to store in a storage.

2. Description of the Related Art

Data deduplication is a data reduction technique for eliminating redundant data to improve storage utilization. Deduplication reduces the required storage capacity because only one copy of a unique data unit, also known as a chunk, is stored. Disk based storage systems, such as a storage management server or Virtual Tape Library (VTL), may implement deduplication technology to detect redundant data chunks and reduce duplication by avoiding redundant storage of such chunks. Storage-based data deduplication reduces the amount of storage needed for a given set of files and is most effective in applications where many copies of very similar or even identical data are stored on a single disk, which is common. In the case of data backups, which are routine and performed to protect against data loss, most of data in a given backup has not changed from the previous backup, and may present many opportunities for deduplication to eliminate redundant storage of data.

Data deduplication may operate at the file or block level. File deduplication eliminates duplicate files. Block deduplication looks within a file and saves unique iterations of each block. Block deduplication system operates by dividing a file into a series of chunks. The deduplication system determines whether any of the chunks are already stored, and then proceeds to only store those non-redundant chunks. Redundancy may be checked with chunks in the file being stored or chunks already stored in the system.

A chunk may be uniquely identified by a digest calculated from the chunk data. If an entry is found for a digest of chunk data, then a redundant chunk is identified, and that chunk in the data object or object can be replaced with a pointer to the matching chunk maintained in storage.

If a deduplication appliance or manager is receiving thousands of chunks of data to deduplicate, the deduplication appliance may have to stall the ingest streams to allow for the indexing of chunk digests for the data chunks so that multiple copies of a chunk of data are not stored. Other techniques for managing the processing of numerous received chunks to deduplicate are to write/commit extents on a per chunk basis or write data twice and clean up later.

There is a need in the art for improved techniques for performing deduplication operations.

SUMMARY

Provided are a computer program product, system, and method for deduplicating chunk digests received for chunks in objects in objects provided by clients to store in a storage. An index has chunk signatures calculated from chunks of data in the data objects in the storage, wherein each index entry includes at least one of the chunk signatures and a reference to the chunk of data from which the signature was calculated. A transaction requests a shared lock for a chunk digest calculated from a chunk in an object to add to the storage. In response to not receiving the shared lock, the transaction is granted a shared lock to the chunk digest in wait mode. The transaction does not proceed until being granted the shared lock. In response to receiving the shared lock, a determination is made as to whether the chunk digest is in the index. A reference to the chunk data is provided for the object when the chunk digest is indicated in the index.

DETAILED DESCRIPTION

When a system is deduplicating data that is streaming in from numerous sources the chances of a duplicate data extent being processed by independent threads, and cores, becomes increasingly likely. In fact, in a deduplication environment where 8:1, or better, deduplication ratio is expected, duplicate data extents being simultaneously received is a common occurrence. Detection of in-flight matches of chunks that match currently indexed chunks or matches chunks concurrently being received that are not in the deduplication index are needed to ensure that the unique data chunks are only stored once and there is no need for a follow-up distillation process to remove multiple copies of the data chunks.

Described embodiments provide techniques for deduplicating chunks of storage that is highly scalable and capable of deduplicating a stream of numerous chunks of data from different clients. Upon receiving a chunk digest calculated from a chunk of data to deduplicate, a transaction is initiated to handle the deduplication of the chunk digest by requesting a shared lock for the chunk digest of the chunk in the object to add to the storage. If the transaction does not receive the shared lock, the transaction is granted a shared lock to the chunk digest in a wait mode where the transaction does not proceed until being granted the shared lock. If the shared lock is received, then the transaction determines whether the chunk digest is in a deduplication index, and if so, a reference to the data chunk is included in the object without adding a duplicate instance of that chunk to the storage.

Figure 1:
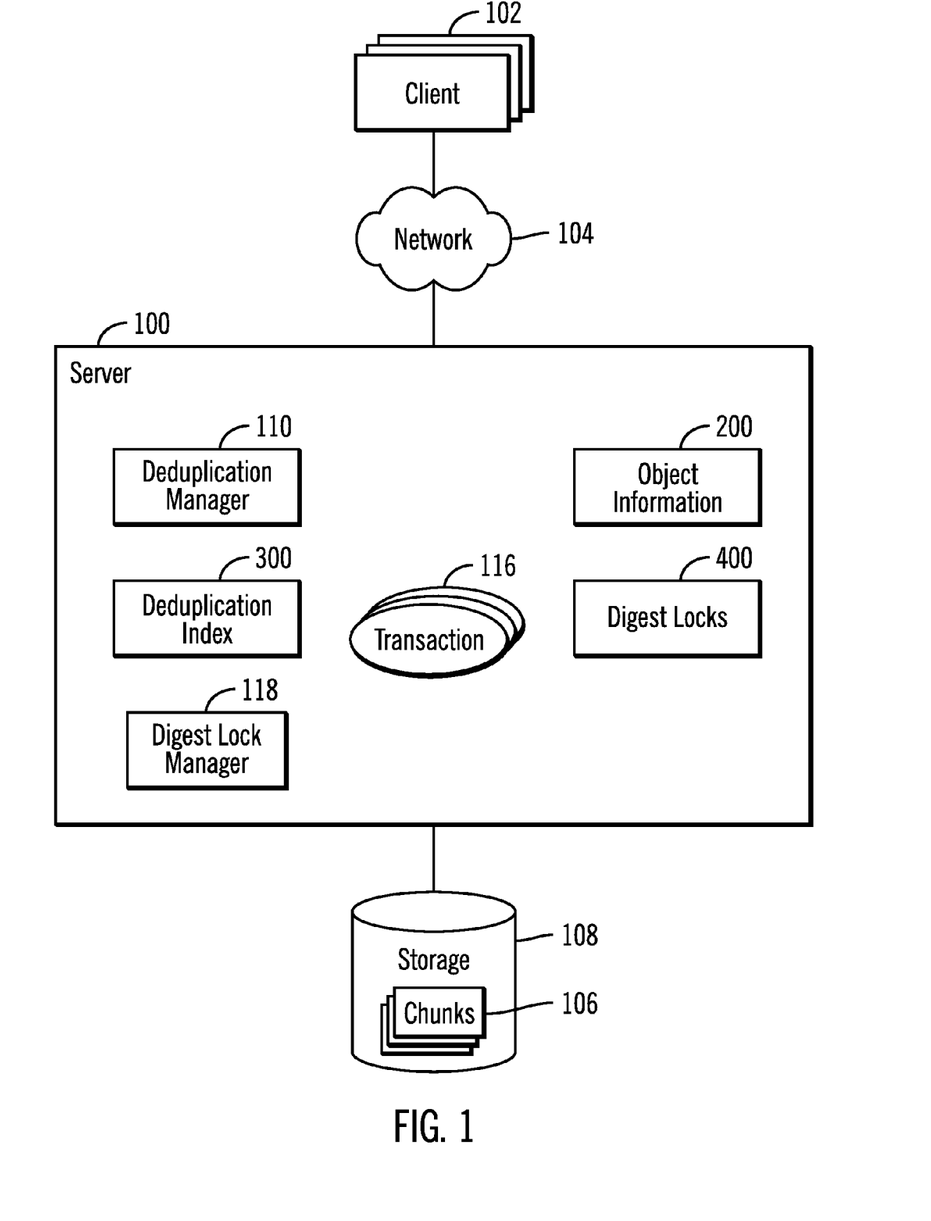
FIG. 1 illustrates an embodiment of a storage environment.

FIG. 1 illustrates an embodiment of a storage environment having a server 100 that receives and processes data objects from clients 102 over a network 104. The objects are comprised of chunks 106 of data the server 100 stores in a storage 108. The server 100 has a deduplication manager 110 to manage the storage of data objects in the storage 108.

Figure 2:
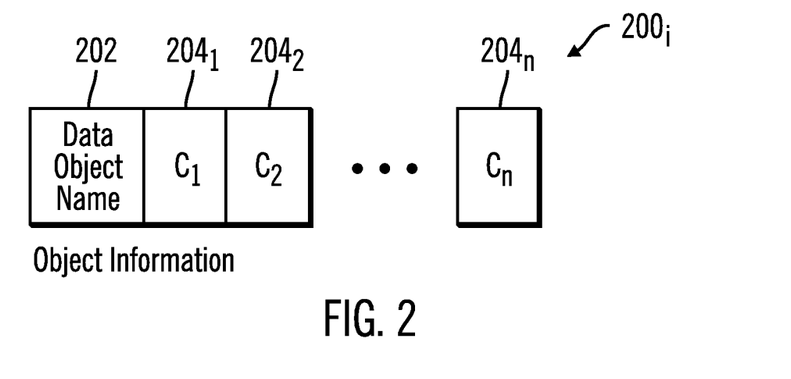
FIG. 2 illustrates an embodiment of object information for an object sent by the clients to store in the storage.

The deduplication manager 110 maintains object information 200 having information on the objects received from the clients 102 having data chunks stored in the storage 108. The object information 200 may provide an ordered list of chunks 106 and the addresses of those chunks 106 in the storage 108. The objects represented in the object information 200 whose chunks 106 of data are stored in the storage 108 may comprise files, database tables, multimedia content, programs, data sets or any other grouping of data that may be presented for storage. The deduplication manager 110 may provide storage for active data objects being used by the clients 102 in real time operations and/or may comprise a backup manager backing-up and archiving client 102 data objects.

Figure 3:
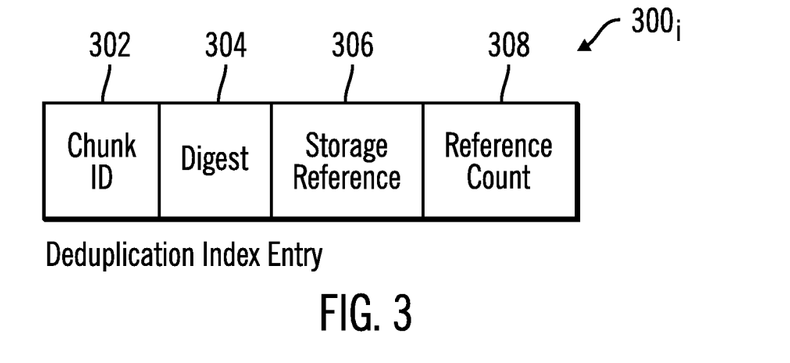
FIG. 3 illustrates an embodiment of a deduplication index entry in a deduplication index.

The deduplication manager 110 maintains a deduplication index 300 having information on the chunks 106 in the storage 108 to ensure that when storing received chunks from data objects, only one copy of a chunk 106 is stored in the storage 108, i.e., no duplicate copies, although one chunk 106 may be referenced in multiple data objects from one or more clients 102.

The deduplication manager 110 may continually receive numerous streams of chunks for objects from the clients 102. The clients 102 may generate a chunk digest for each of the chunks in the objects the clients 102 want to store and provide to the deduplication manager 110 to determine whether the chunk represented by the chunk digest is already in the storage 108 or needs to be added to the storage 108. If the deduplication manager 110 determines the chunk 106 is already in storage 108 and indicated in the deduplication index 300, then the client 102 does not need to send the chunk and consume network 104 bandwidth. If the deduplication manager 110 determines the chunk is not in storage, then the client 102 will send the chunk to the server 100 to store in the storage 108. In an alternative implementation, the clients 102 may send the server 102 the chunk, and the deduplication manager 110 may generate the chunk digest.

A chunk digest may be calculated by processing the chunk data to generate a unique value for the chunk, such as by using the as MD5 (Message-Digest Algorithm 5) or SHA-1 (Secure Hash Algorithm 1), which calculates cryptographic hashes of chunks 106 in a data object.

Figure 4:
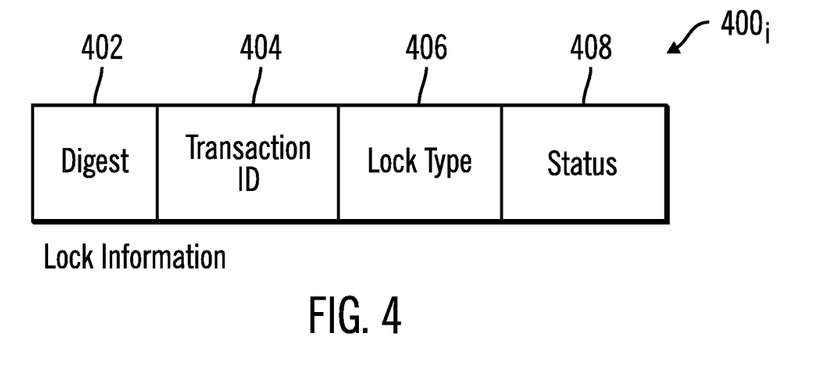
FIG. 4 illustrates an embodiment of lock information for a lock for a digest for chunk data.

A transaction 116 is initiated for each received chunk digest to process for deduplication. The transactions 116 request locks for the chunk digests from a digest lock manager 118. The digest lock manager 118 maintains digest locks 400 comprising a list of shared and exclusive locks granted to transactions 116 for chunk digests, where a shared lock may be granted or in wait mode where the transaction 116 comprises a waiter waiting for the shared lock before proceeding.

The server 100 may communicate with the clients 102 over a network 104, such as a local area network (LAN), storage area network (SAN), wide area network (WAN), cloud computing model, etc. In further embodiments, the server 100 and clients 102 may be connected by a direct cable connection or may comprise components on a single computer system platform, and may communicate over a bus or via memory.

The storage 108 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The deduplication manager 110, digest lock manager 118, and transactions 116, may comprise a software program in a memory executed by a processor of the server 2. In an alternative embodiment, some portion or all of the deduplication manager 110 and digest lock manager 118 may be implemented in a hardware component, such as a dedicated integrated circuit, e.g., Application Specific Integrated Circuit (ASIC), expansion card, etc.

FIG. 2 illustrates an embodiment of an instance of object information $200_i$ for one data object being stored by one of the clients 102 maintained in the object information 200. The object information $200_i$ for one data object includes a data object name 202 assigned to the data object by the client 102, such as a unique identifier name and one or more chunk identifiers $(C_i)$ $204_1$, $204_2$ ... $204_n$ of chunks assigned to the client data object 202. The actual chunks may be of variable length, i.e., have the same or different lengths, or of a fixed length. The object information $200_i$ may maintain an ordered list of the chunk identifiers $(C_1 \ldots C_n)$ indicating the order 1 ... n in which the chunks appear in the data object 202.

In one embodiment, the chunk identifier $(C_i)$ $204_1$, $204_2$ ... $204_n$ indicates a digest calculated by processing the chunk data to generate a unique value for the chunk, such as by using the as MD5 (Message-Digest Algorithm 5) or SHA-1 (Secure Hash Algorithm 1), which calculates cryptographic hashes of chunks in a data object. The chunk identifiers $204_1$, $204_2$ ... $204_n$ may also include other identifying data of the chunk, such as the length of the chunk of data.

FIG. 3 illustrates an embodiment of an instance of a deduplication index entry $300_i$ in the deduplication index 300 for one of the chunks 106 in the storage 108. The index entry $300_i$ includes a chunk identifier (ID) 302 identifying the chunk in the storage 108; a digest 304, such as calculated according to the technique used to calculate the chunk identifiers $304_1$, $304_2$ ... $304_n$; a storage reference 306 includes the location of the chunk 106 in the storage 108; and a reference count 308 indicating a number of data objects $200_i$ currently referencing the chunk identified by the digest 304.

FIG. 4 illustrates an embodiment of an instance of lock information $400_i$ for one lock in the digest locks 400 the lock manager 118 grants to a transaction 116 to perform deduplication for the chunk digest. The lock information $400_i$ may include a digest 402 comprising the digest calculated from the chunk subject to the transaction 116; a transaction identifier (ID) 404 identifying the transaction 116 requesting the lock; a lock type 406, such as exclusive or shared; and a status 408 of the lock, such as granted or waiting.

A transaction 404 waiting for a shared lock comprises a waiter, that cannot proceed with operations to perform the deduplication until the shared lock is granted. In one embodiment, when a transaction 116 requests a shared lock in a wait mode, then another transaction has the exclusive lock for the digest 402. The transactions 116 waiting for a shared lock will not receive the shared lock until the transaction 116 holding the exclusive lock to update the deduplication index 300 is flushed and committed to the index 300 and the exclusive lock to the digest released.

Figure 5:
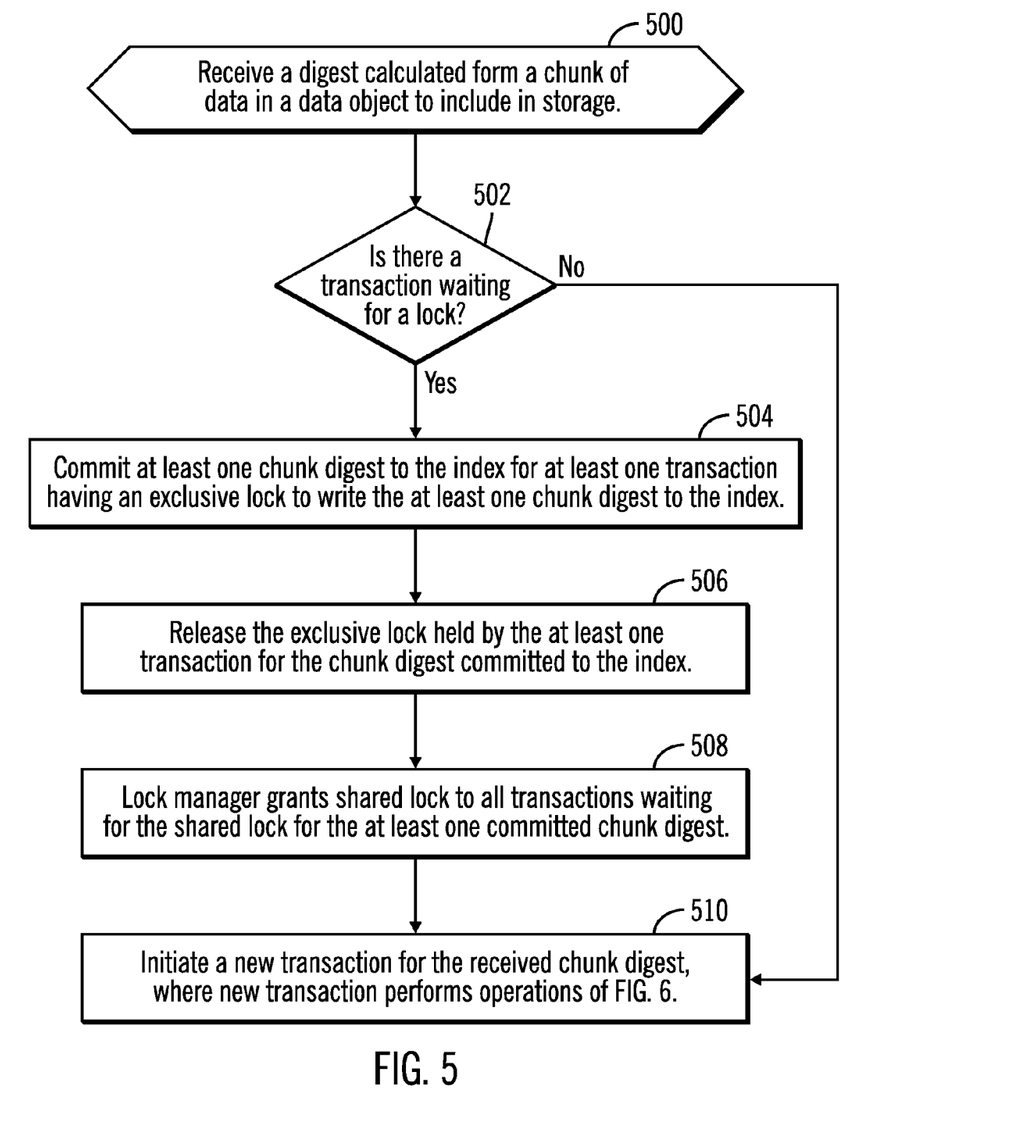
FIG. 5 illustrates an embodiment of operations to process a chunk digest for a chunk of data in an object to include in the storage.

FIG. 5 illustrates an embodiment of operations performed by the deduplication manager 110 and the digest lock manager 118 to initiate a transaction 116 to determine whether to add a received digest calculated from a chunk of data in a data object to the deduplication index 300 and include in the chunk in the storage 108. The deduplication manager 110 may receive a continuous stream of chunk digests to process for deduplication from one or more of the clients 102. Each client 102 may manage its own deduplication session producing a stream of chunks to deduplicate. Upon receiving (at block 500) a chunk digest, the deduplication manager 110 determines (at block 502) whether there is a transaction 116 waiting for a lock $400_i$. This may be determined from a list of waiting transactions or by determining whether there are any locks $400_i$ of the shared lock type 406 having a wait status 408. If (at block 502) there are transactions 116 waiting for a shared lock, the deduplication manager 110 initiates a commit and flush to commit any chunk digests to the deduplication index 300 for any transactions having an exclusive lock for the chunk digest to write the chunk of data to the storage 108. Prior to the commit and flush, the chunk digest and chunk may have been written to the storage 108, but the new index entry $300_i$ for the new chunk digest may not have been committed to the deduplication index 300.

After committing any chunk digests to the deduplication index 300 for written chunk data, the digest lock manager 118 may release (at block 506) the exclusive lock held by any transactions for the chunk digests committed to the deduplication index 300. The digest lock manager 118 then grants (at block 508) a shared lock to any transactions 116 waiting for the shared lock for the committed chunk digests, indicated in the digest locks 400. From block 508 or if (at block 502) there are no pending transactions 116 waiting for a shared lock for the received chunk digest, the deduplication manager 110 initiates a new transaction 116 for the received chunk digest, which then proceeds to perform the deduplication operations in FIG. 6.

With the operations of FIG. 5 the deduplication manager 110 when processing a newly received chunk digest, commits and flushes any pending transactions having the exclusive lock to add a chunk digest to the deduplication index 300 for chunk data written to the storage 108. In this way when receiving a new chunk to deduplicate, commit and flush is performed for all transactions waiting to complete the process to write a chunk of data to the storage 108 and update the deduplication index 300 with the digest for the written chunk. The commit and flush is performed with respect to all chunk digests having waiter transactions, which would include transactions 116 waiting for the new chunk digest just received for deduplication and for other chunk digests. This ensures that if a chunk digest is received for a chunk digest waiting to be flushed, deduplication is not performed until that chunk digest waiting to be committed is added to the deduplication index 300. After performing the commit and flush, a new transaction 116 is initiated to perform the deduplication for the received chunk digest to determine whether the received chunk digest needs to be added to the deduplication index 300.

In alternative embodiments, the commit and flush may be performed after receiving a predetermined number of chunk digests to subject to deduplication.

Figure 6:
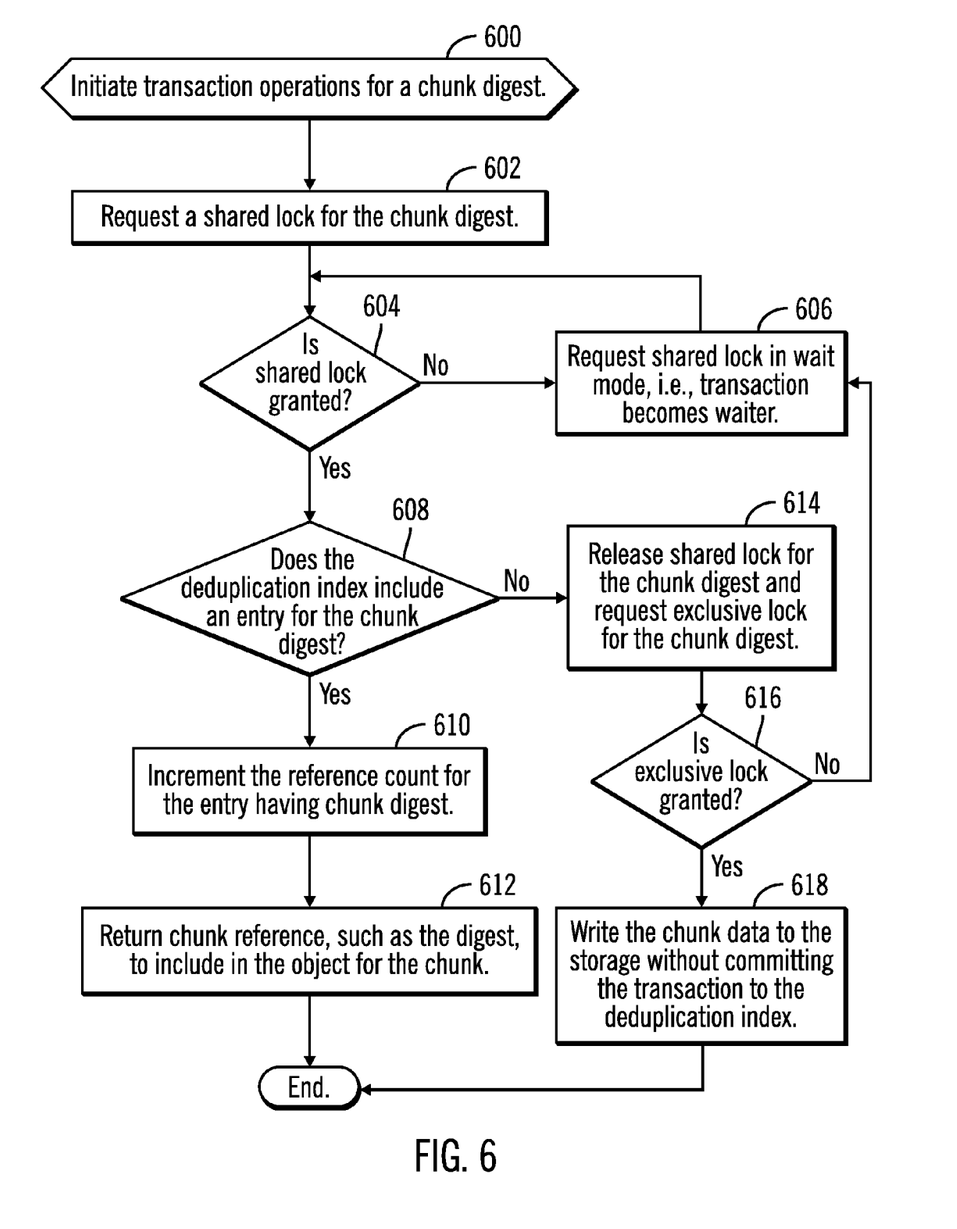
FIG. 6 illustrates an embodiment of operations for a transaction to perform deduplication for a chunk digest of a chunk of data.

FIG. 6 illustrates an embodiment of operations performed by a transaction 116 to perform deduplication for a received chunk digest. Upon initiating (at block 600) a transaction 116 to deduplicate a chunk digest, the transaction 116 requests (a block 602) a shared lock for the chunk digest. If (at block 604) the shared lock is not granted, the transaction 116 requests (at block 606) a shared lock in wait mode, where the transaction 116 becomes a waiter. By being in the wait state, the waiting transaction 116 signals to the deduplication manager 110 to flush and commit any chunk digests to the deduplication index 300, including the chunk digest for which the transaction 116 became a waiter, which occurs when another transaction has an exclusive lock for the chunk digest to write the chunk data 106 for the chunk digest to storage.

If (at block 604) the shared lock is granted, then the transaction 116 determines (at block 608) whether the deduplication index 300 includes an index entry $300_i$ having the chunk digest 304 for which the shared lock is granted, such as by querying the deduplication index 300. If (at block 608) the deduplication index 300 includes an entry $300_i$ for the chunk digest 304 being deduplicated by the transaction 116, then the reference count 308 for the deduplication index entry $300_i$ for the chunk digest is incremented (at block 610). The reference for the chunk, such as the digest, is returned (at block 612) to include in the object information $200_i$ to reference that chunk data 106 in the storage 108 without adding the chunk data to the storage 108.

If (at block 608) the deduplication index 300 does not include an entry for the chunk digest, then the transaction 116 releases (at block 614) the shared lock for the chunk digest it already holds and requests an exclusive lock for the chunk digest. If (at block 616) the exclusive lock is granted, then the transaction 116 writes (at block 618) the chunk data to the storage 108 without committing the transaction to the deduplication index 300. If (at block 616) the exclusive lock is not granted, which occurs when another transaction has the exclusive lock for the chunk digest, then control proceeds to block 606 to request the shared lock in wait mode.

A transaction 116 waiting for the shared lock upon receiving the shared lock after the exclusive lock is released, would proceed to block 608 to determine whether the deduplication index 300 has an entry for the chunk digest. If the shared lock is granted to a waiting transaction 116 after the flush and commit of the transaction for the chunk digest to the deduplication index 300, then the deduplication index 300 would have an entry for the chunk digest for the transaction 116 in the deduplication index 300 to include in the object for the chunk data.

Figure 7:
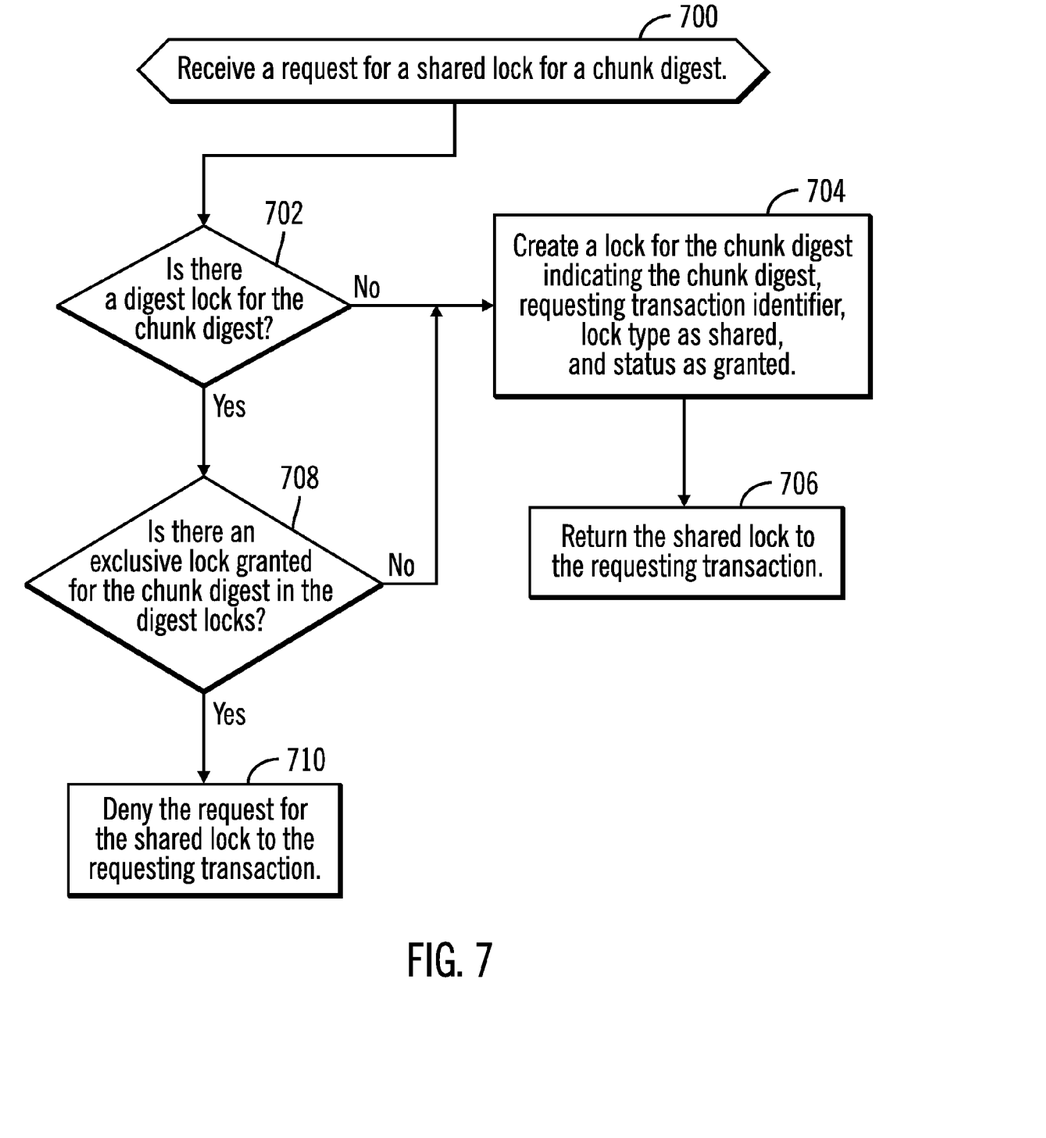
FIG. 7 illustrates an embodiment of operations to process a request for a shared lock.

FIG. 7 illustrates an embodiment of operations performed by the digest lock manager 118 to process shared lock requests from the transactions 116 performing the deduplication for chunk digests, such as requested at block 602 in FIG. 6. Upon receiving (at block 700) a request for a shared lock for a chunk digest, the digest lock manager 118 determines whether there is a digest lock $400_i$ in the digest locks 400 for the chunk digest, such as having the chunk digest in the digest field 402 of the lock. If not, then a lock $400_i$ is created (at block 704) for the chunk digest indicating the chunk digest in field 402, the requesting transaction in the requesting transaction identifier 404, the lock type 406 as shared, and the status 408 as granted. The shared lock is returned (at block 706) to the requesting transaction 116.

If (at block 702) there is a lock $400_i$ for the chunk digest and the held lock 406 is not exclusive, i.e., shared, then from the no branch of block 708 control proceeds to block 704 to create a shared lock for the request. If (at block 708) the pending held lock $400_i$ is exclusive, then the request for the shared lock is denied (at block 710) to the requesting transaction 116.

Figure 8:
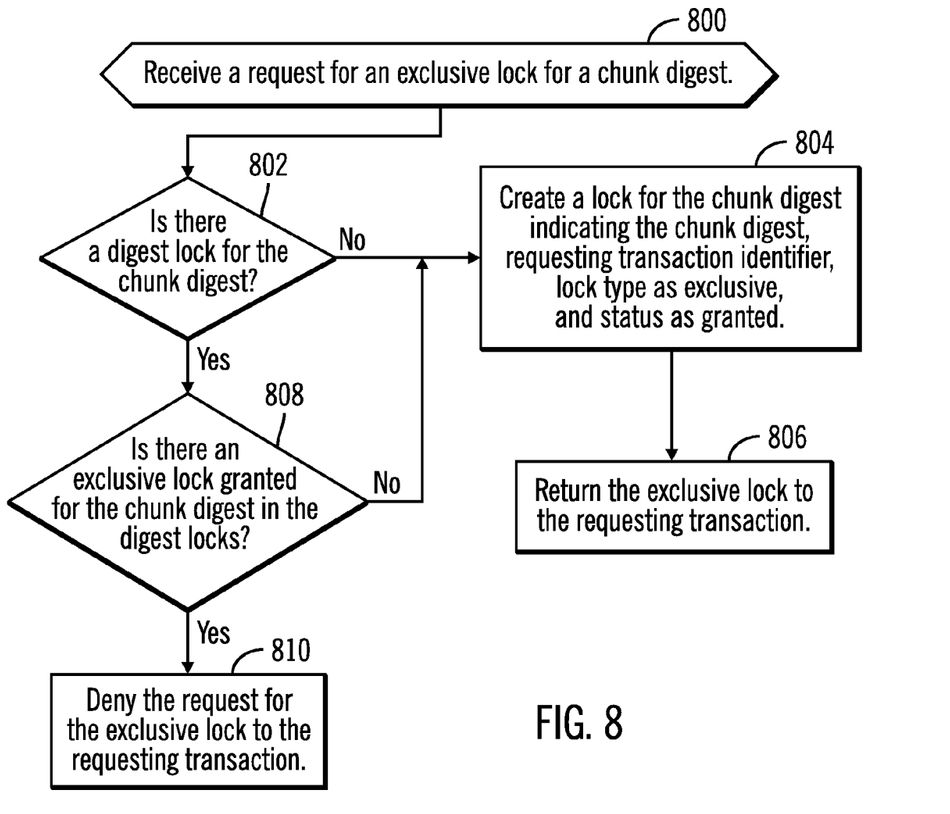
FIG. 8 illustrates an embodiment of operations to process a request for an exclusive lock.

FIG. 8 illustrates an embodiment of operations performed by the digest lock manager 118 to process exclusive lock requests from the transactions 116 performing the deduplication for chunk digests such as requested at block 614 in FIG. 6. Upon receiving (at block 800) a request for an exclusive lock for a chunk digest, the digest lock manager 118 determines (at block 802) whether there is a digest lock $400_i$ for the chunk digest, such as having the chunk digest in the digest field 402 of the lock. If not, then a lock $400_i$ is created (at block 804) for the chunk digest indicating the chunk digest in field 402; the requesting transaction in the requesting transaction identifier 404, the lock type 406 as exclusive, and the status 408 as granted. The exclusive lock is returned (at block 806) to the requesting transaction. 116

If (at block 802) there is a lock $400_i$ for the chunk digest and the held lock 406 is not exclusive, i.e., shared, then from the no branch of block 808 control proceeds to block 804 to create an exclusive lock for the request. If (at block 808) the pending held lock $400_i$ is exclusive, then the request for the exclusive lock is denied (at block 810) to the requesting transaction 116.

Figure 9:
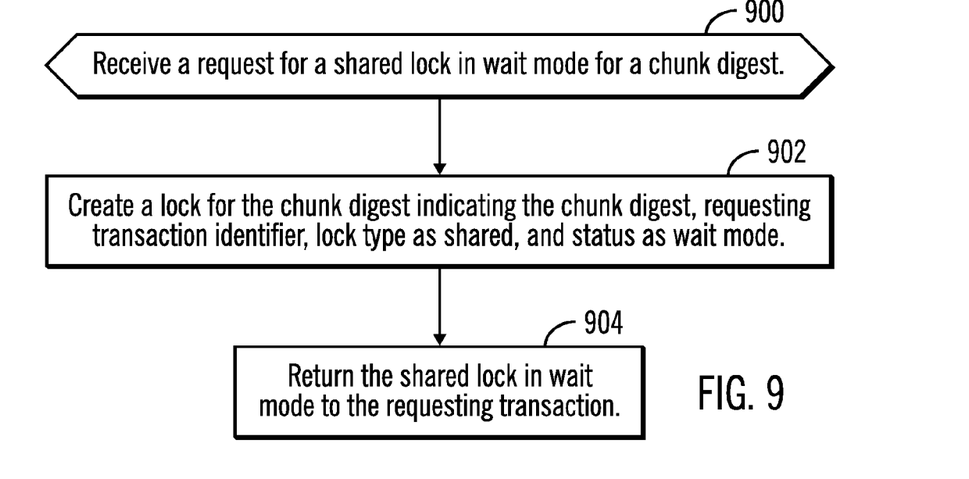
FIG. 9 illustrates an embodiment of operations to process a request for a shared lock in wait mode.

FIG. 9 illustrates an embodiment of operations performed by the digest lock manager 118 to process requests for shared locks in wait mode from the transactions 116 performing the deduplication for chunk digests, such as requested at block 606 in FIG. 6. Upon receiving (at block 900) a request for a shared lock in wait mode, the digest lock manager 118 creates (at block 902) a lock $400_i$ for the chunk digest indicating the chunk digest in field 402; the requesting transaction in the requesting transaction identifier 404, the lock type 406 as shared, and the status 408 as wait mode. The shared lock in wait mode is returned (at block 904) to the requesting transaction. 116

Described embodiments provide techniques to process a stream of chunk data to deduplicate by using locking mechanisms for deduplication transactions processing chunk digests to determine whether the chunk data needs to be written or is already stored in the storage. With the described embodiments, deduplication transactions will receive a shared lock for a chunk digest to determine whether the chunk data for the chunk digest needs to be added to storage or whether the chunk data is already stored. However, if an exclusive lock is held for the chunk digest, meaning another transaction is adding the chunk data to the chunk digest to storage, then a shared lock in wait mode is granted to the transaction to wait for the deduplication index to be updated with the client digest.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

Figure 10:
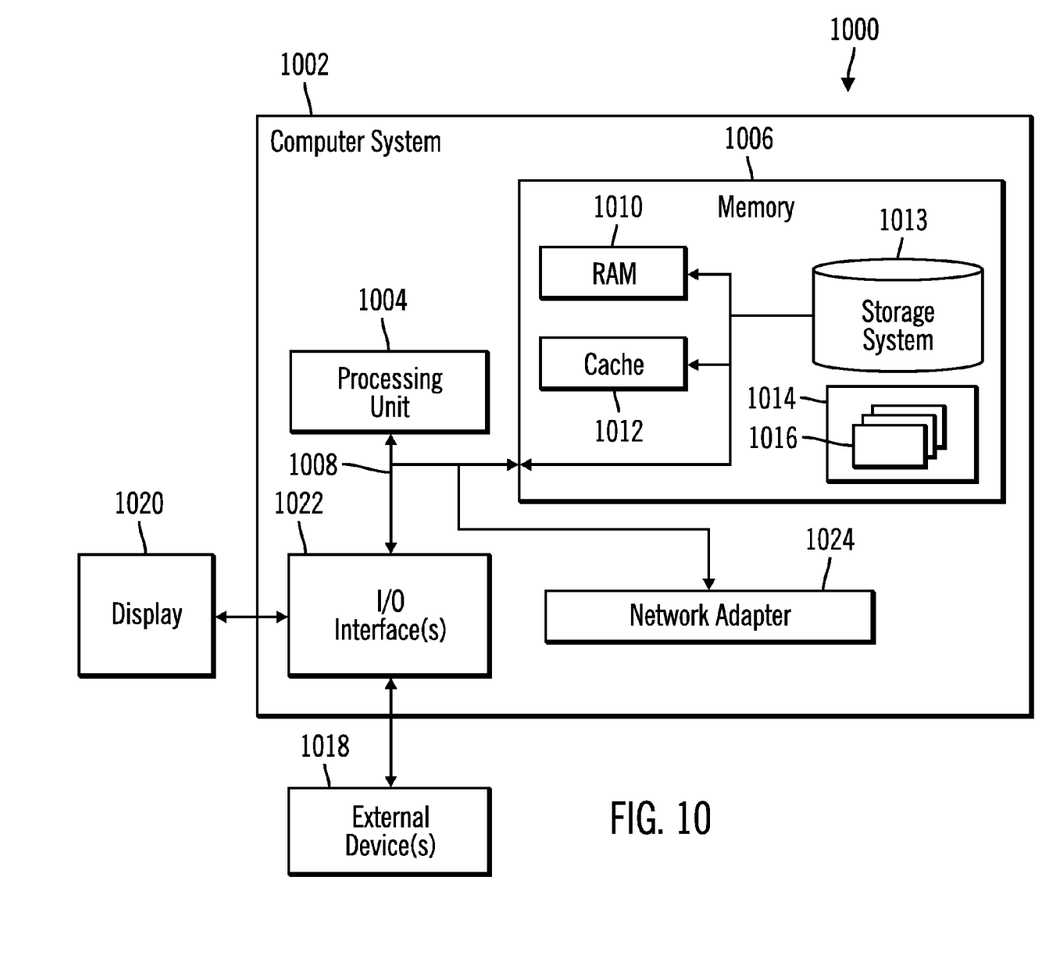
FIG. 10 illustrates a computing environment in which the components of FIG. 1 may be implemented.

The computational components of FIG. 1 including the server 100 and clients 102 may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components may be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing deduplication for a storage, the computer program product comprising a computer readable storage medium having computer readable program code embodied therein that executes to perform operations, the operations comprising:
   maintaining an index of chunk digests calculated from chunks of data in data objects in the storage, wherein each index entry includes a chunk digest and a reference to a chunk of data from which the chunk digest was calculated;
   requesting, by a transaction, a shared lock for a chunk digest calculated from a chunk in an object to add to the storage, wherein the transaction is to perform deduplication on the chunk from which the chunk digest is calculated using the chunk digest;
   in response to not receiving the shared lock, granting the transaction a shared lock to the chunk digest in wait mode, wherein the transaction does not proceed until being granted the shared lock;
   in response to receiving the shared lock, determining whether the chunk digest is in the index; and
   providing a reference to the chunk of data for the object when the chunk digest is indicated in the index.

2. The computer program product of claim 1, wherein the operations further comprise:
   in response to the requesting the shared lock for the chunk digest, granting the shared lock in response to there being no exclusive lock held for the chunk digest, wherein the shared lock indicates the chunk digest and the transaction.

3. The computer program product of claim 1, wherein the operations further comprise:
   receiving an additional chunk digest calculated from an additional chunk;
   determining whether there is at least one transaction waiting for a shared lock in response to receiving the additional chunk digest; and
   committing at least one chunk digest to the index for at least one transaction having an exclusive lock for the at least one chunk digest in response to determining that there are transactions waiting for the shared lock.

4. The computer program product of claim 3, wherein the at least one chunk digest committed to the index comprises at least one chunk digest different from the received additional chunk digest.

5. The computer program product of claim 3, wherein the operations further comprise:
   releasing at least one exclusive lock for the at least one transaction that held the exclusive lock for the chunk digest committed to the index; and
   granting the shared lock for the chunk digest subject to the released at least one exclusive lock to any transactions waiting for the shared lock, wherein the transactions granted the shared lock for which they waited add a reference to the chunk digest in the index to the object having the chunk of data from which the chunk digest was generated.

6. The computer program product of claim 3, wherein the operations further comprise:
   initiating a new transaction to request a shared lock for the additional chunk digest to perform deduplication on an additional chunk from which the additional chunk digest is calculated in response to committing the at least one chunk digest to the index.

7. The computer program product of claim 1, wherein the operations further comprise:
   requesting, by the transaction, an exclusive lock for the chunk digest in response to determining that the chunk digest is not included in the index; and
   writing the chunk of data for the chunk digest to the storage in response to receiving the exclusive lock to the chunk digest.

8. The computer program product of claim 7, wherein the operations further comprise:
   in response to the requesting the exclusive lock for the chunk digest, granting the exclusive lock in response to there being no exclusive lock held for the chunk digest, wherein the exclusive lock indicates the chunk digest and the transaction.

9. The computer program product of claim 7, wherein in response to not receiving the exclusive lock, further performing:
granting a shared lock for the chunk digest in wait mode to the transaction requesting the exclusive lock when another transaction holds the exclusive lock to the chunk digest.

10. The computer program product of claim 1, wherein the operations further comprise:
receiving a stream of chunk digests for chunks in a plurality of objects being added to the storage, wherein the operations of requesting the shared lock, indicating that the transaction is a waiter, determining whether the chunk digest is in the index, and including the reference are performed for each of the chunk digests of the stream.

11. A system for performing deduplication for a storage, comprising:
a processor; and
a computer readable storage medium having computer program code that when executed by the processor performs operations, the operations comprising:
maintaining an index of chunk digests calculated from chunks of data in data objects in the storage, wherein each index entry includes a chunk digest and a reference to a chunk of data from which the chunk digest was calculated;
requesting, by a transaction, a shared lock for a chunk digest calculated from a chunk in an object to add to the storage, wherein the transaction is to perform deduplication on the chunk from which the chunk digest is calculated using the chunk digest;
in response to not receiving the shared lock, granting the transaction a shared lock to the chunk digest in wait mode, wherein the transaction does not proceed until being granted the shared lock;
in response to receiving the shared lock, determining whether the chunk digest is in the index; and
providing a reference to the chunk of data for the object when the chunk digest is indicated in the index.

12. The system of claim 11, wherein the operations further comprise:
receiving an additional chunk digest calculated from an additional chunk;
determining whether there is at least one transaction waiting for a shared lock in response to receiving the additional chunk digest; and
committing at least one chunk digest to the index for at least one transaction having an exclusive lock for the at least one chunk digest in response to determining that there are transactions waiting for the shared lock.

13. The system of claim 12, wherein the operations further comprise:
releasing at least one exclusive lock for the at least one transaction that held the exclusive lock for the chunk digest committed to the index; and
granting the shared lock for the chunk digest subject to the released at least one exclusive lock to any transactions waiting for the shared lock, wherein the transactions granted the shared lock for which they waited add a reference to the chunk digest in the index to the object having the chunk of data from which the chunk digest was generated.

14. The system of claim 11, wherein the operations further comprise:
requesting, by the transaction, an exclusive lock for the chunk digest in response to determining that the chunk digest is not included in the index; and
writing the chunk of data for the chunk digest to the storage in response to receiving the exclusive lock to the chunk digest.

15. The system of claim 14, wherein in response to not receiving the exclusive lock, further performing:
granting a shared lock for the chunk digest in wait mode to the transaction requesting the exclusive lock when another transaction holds the exclusive lock to the chunk digest.

16. The system of claim 11, wherein the operations further comprise:
receiving a stream of chunk digests for chunks in a plurality of objects being added to the storage, wherein the operations of requesting the shared lock, indicating that the transaction is a waiter, determining whether the chunk digest is in the index, and including the reference are performed for each of the chunk digests in the stream.

17. A method for performing deduplication for a storage, comprising:
maintaining an index of chunk digests calculated from chunks of data in data objects in the storage, wherein each index entry includes a chunk digest and a reference to a chunk of data from which the chunk digest was calculated;
requesting, by a transaction, a shared lock for a chunk digest calculated from a chunk in an object to add to the storage, wherein the transaction is to perform deduplication on the chunk from which the chunk digest is calculated using the chunk digest;
in response to not receiving the shared lock, granting the transaction a shared lock to the chunk digest in wait mode, wherein the transaction does not proceed until being granted the shared lock;
in response to receiving the shared lock, determining whether the chunk digest is in the index; and
providing a reference to the chunk of data for the object when the chunk digest is indicated in the index.

18. The method of claim 17, further comprising:
receiving an additional chunk digest calculated from an additional chunk;
determining whether there is at least one transaction waiting for a shared lock in response to receiving the additional chunk digest; and
committing at least one chunk digest to the index for at least one transaction having an exclusive lock for the at least one chunk digest in response to determining that there are transactions waiting for the shared lock.

19. The method of claim 18, further comprising:
releasing at least one exclusive lock for the at least one transaction that held the exclusive lock for the chunk digest committed to the index; and
granting the shared lock for the chunk digest subject to the released at least one exclusive lock to any transactions waiting for the shared lock, wherein the transactions granted the shared lock for which they waited add a reference to the chunk digest in the index to the object having the chunk of data from which the chunk digest was generated.

20. The method of claim 17, further comprising:
requesting, by the transaction, an exclusive lock for the chunk digest in response to determining that the chunk digest is not included in the index; and writing the chunk of data for the chunk digest to the storage in response to receiving the exclusive lock to the chunk digest.

21. The method of claim 20, wherein in response to not receiving the exclusive lock, further performing:

granting a shared lock for the chunk digest in wait mode to the transaction requesting the exclusive lock when another transaction holds the exclusive lock to the chunk digest.

22. The method of claim 17, further comprising:

receiving a stream of chunk digests for chunks in a plurality of objects being added to the storage, wherein the requesting the shared lock, indicating that the transaction is a waiter, determining whether the chunk digest is in the index, and including the reference are performed for each of the chunk digests in the stream.

* * * * *